June 3, 1941.  A. W. MILLER  2,244,400

LOCK-NUT CONSTRUCTION

Filed Feb. 24, 1940

Inventor
Albert W. Miller
By Lyon & Lyon
Attorneys

Patented June 3, 1941

2,244,400

UNITED STATES PATENT OFFICE 2,244,400

LOCK-NUT CONSTRUCTION

Albert W. Miller, Jamaica, N. Y.

Application February 24, 1940, Serial No. 320,694

7 Claims. (Cl. 151—19)

This invention relates to a lock-nut device, the purpose of which is to prevent the nut that is tightened up on a thread, from backing off as sometimes occurs in use with an ordinary nut and bolt, and particularly on account of vibration.

One of the objects of the invention is to provide a construction which will operate in such a way that when the nut is in place, any backward rotation of the nut on the bolt will develop an increasing resistance. In other words, to provide a construction in which, although in the tight position of the nut, the resistance will be offered to its backward rotation, and also a resistance that will constantly increase with the continued backward rotation of the nut.

In practicing the invention a nut is provided, composed of two lock members which are preferably interlocked together so that they can be applied simultaneously to the thread of the bolt on which the lock-nut is carried, and between the two lock members an eccentric connection is provided which, upon a relative rotation of the two locking members, places the lock members in relation such that an increasing resistance would be offered to the unscrewing or backing off of the inner lock member that is clamped against a plate or similar seat. I am aware that a lock-nut of this general structure has been employed heretofore, and such prior improvements are embodied in a patent granted to S. J. Ross, deceased, on September 2, 1919, entitled "Lock nut device," Patent No. 1,315,160. The Ross construction, however, was objectionable in that when the lock-nut feature was in operation, the locking strains set up in the two parts of the nut, would give a gradually decreasing resistance to a backward relative rotation of the nut members, which would loosen up the "lock."

In the Ross lock-nut device, the two lock-nuts or lock members were interconnected by the use of an annular fin on one lock member, and an annular groove on the adjacent face of the other lock member. By pressing the lock members toward each other, the fin was caused to bend into the groove and prevent the two lock members from being separated from each other. However, in the Ross lock-nut, the construction was such that after being interconnected, considerable play or lost motion still existed between the two lock members. This was objectionable because it would not maintain the lock members constantly in the proper relative oriented position to enable them to be screwed onto the bolt. One of the objects of the present invention is to improve the construction of the Ross nut, and to provide a construction such that when the locking feature has been set in operation, then if a relative rotation of the outer lock member with respect to the inner lock member takes place in a backward direction, an increasing resistance would be met with. Another object of my invention has been to combine my improvements with other features of lock-nut construction, so that the parts will cooperate to enable the two lock members to constantly maintain themselves in the proper oriented relation to enable them to be screwed onto the bolt.

Further objects of the invention will appear hereinafter.

The invention consists in the novel parts and combination of parts to be described hereinafter, all of which contribute to produce an efficient lock-nut construction.

A preferred embodiment of the invention is described in the following specification, while the broad scope of the invention is pointed out in the appended claims.

Figure 2:
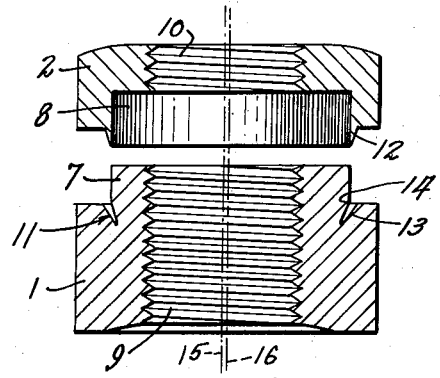
Fig. 2 is a vertical section through the two lock members representing the same ready to be pressed together.
Figure 3:
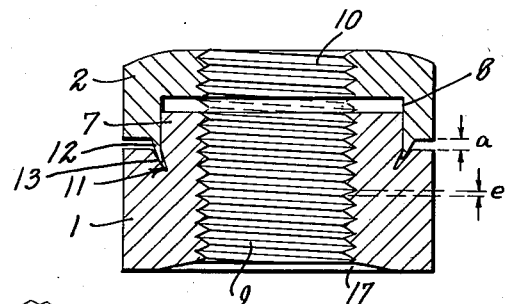
Fig. 3 is a view similar to Fig. 2, but representing the two lock members pressed together in their proper oriented position to enable them to be screwed simultaneously onto the bolt. This view indicates in dotted lines the continuity of relation of the threads in the two lock members.

In practicing the invention, I provide an inner locking member or nut body 1, and a second locking member or check nut 2. In practice, these two lock members are preferably connected together so as to be applied at the same time to the thread 3 of a bolt 4, or to any other externally threaded part on which the lock-nut effect is to be attained. In the present instance, the lock-nut is illustrated as clamping two plates 5 together and against a shoulder 6 on the bolt 4. Between the two lock members I provide an eccentric connection which is capable of assuming a neutral position in which the axes of the lock members are in alignment; and when the locking members are rotated relatively to each other they become laterally displaced with respect to each other. I provide means for stopping this relative rotation of the locking members when the eccentric connection has been rotated slightly past the point where the maximum displacement occurs. In the present instance this would be through more than 180° from its neutral position. In this way an improved locking effect is attained. In order to accomplish this, I provide one of the lock members, for example, the lock member 1 with an eccentric collar 7, that is to say, this collar is of circular form but with its center slightly eccentric to the axis of the bolt 4. On the adjacent side of the other lock member, that is to say, in the present instance, the lock member 2, I provide a chamber or socket 8 which is of a diameter to enable it to fit over the eccentric collar 7, and this socket is of course eccentric to the axis of the bolt to the same degree of eccentricty as the collar 7. The two lock members have threaded openings 9 and 10 through the same, which are in axial alignment with each other when the eccentric connection is in its neutral position. In other words, the outer lock-nut member 2 is capable of assuming a position on the collar 7 in which the axis of its threaded opening 10 will align with the axis of the threaded opening 9. At this time the side faces of the two lock members will also be in register. This is the relation that the lock members have when they are screwed onto the bolt. The relation of the lock members at that time, is illustrated in Fig. 3. This figure illustrates the condition in which the lock devices would be handled ready to be applied. This view also clearly illustrates an interlocking connection between the adjacent sides of the two lock members, the function of which is to maintain the two lock members yieldingly in the proper relation to enable them to be applied to the bolt. In order to accomplish this, I prefer to provide the lock member 1 with an annular groove 11 preferably of sharp V-form as indicated, and on the adjacent face of the outer lock member I provide an annular fin 12 which is quite thin. When the nuts are being placed together as indicated in Fig. 2, the sharp forward end of this fin engages the lower inclined face 13 of the groove 11, and when this occurs the fin 12 will be bent inwardly toward the axis of the nut. This bending occurs around the shoulder 14 formed between the inner face of the groove 13 and the outer face of the collar 7. The result of this is that the two lock members will be held in any position in which they are left in this telescoping movement of the collar into its socket 8.

The lock members are so constructed that after they have been brought together to a relation such as that illustrated in Fig. 3, it will still be possible for the outer nut member to advance a considerable distance toward the inner lock member. The distance that it can advance should be slightly more than one-half the pitch distance between adjacent threads on the bolt, for a reason that will be presently explained more fully.

Figure 4:
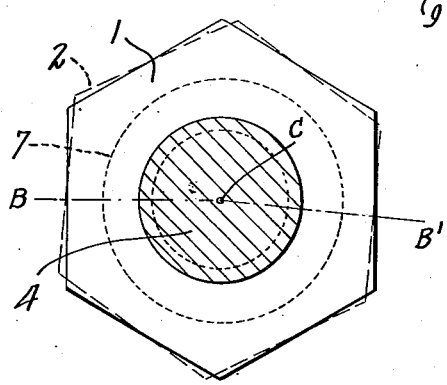
Fig. 4 is a plan of the nut and bolt illustrated in Fig. 1, but showing the bolt in cross-section. In this view in dotted lines the relation of the two lock members is indicated after the relative rotation that applies the lock.
Figure 5:
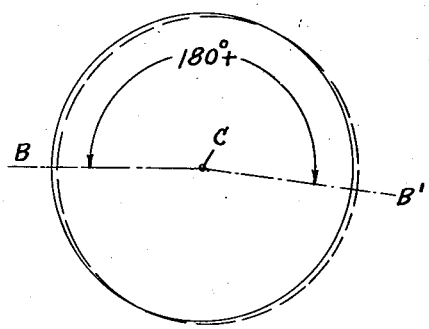
Fig. 5 is a diagrammatic view indicating the amount of relative rotation that is given to the outer lock member in order to attain the locking effect.

With the lock members in the relation indicated in Fig. 3, they are screwed onto the bolt by means of a wrench that rotates both lock members simultaneously. When the inner face of the inner lock member 1 seats itself on the outermost plate 5, its rotation will be arrested. The workman applying the nut, then moves the wrench up so as to rotate the outer lock member 2 relative to the inner lock member, and this rotation continues through slightly more than 180°. The amount of this rotation can be determined by the correlated form of the groove 11 and the fin 12, but is preferably determined by leaving a distance a between the outer adjacent faces of the two lock members (see Fig. 3) which is slightly greater than the distance between the peak and the root of the thread indicated by the letter $e$ in Fig. 3. In other words $a = e+$. The amount of this plus is, of course, slight, but should be sufficient to enable a rotation of a few degrees over 180 to be employed in seating the outer nut member 2. This is illustrated in Fig. 5, in which C indicates the center or axis of the bolt, and the line B—C indicates the position of the axis of eccentricity. The outer nut would be rotated until this axis B—C would occupy the position of the line B'—C. In Fig. 4 the dotted outline of the upper nut member 2 indicates approximately the relation of the corners of this nut after the rotation through 180°+ has taken place.

Figure 1:
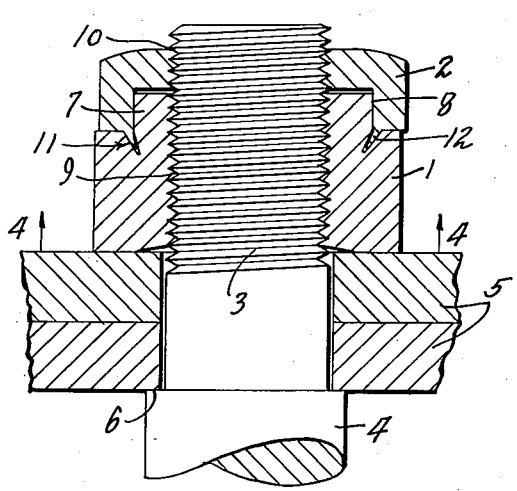
Fig. 1 is a vertical section through two plates showing an end of the bolt in elevation, together with my lock-nut device shown in section, and with the parts in the locked condition.

It should be understood that the degree of eccentricity is readily very slight and would not be evident on a drawing of the scale of the present drawing. However, in order to enable the operation of this invention to be visualized, this feature of the drawing has been exaggerated, and in Fig. 2 the dotted line 15 indicates the coinciding axes of the threaded openings 9 and 10 through the lock members, and the line 16 indicates the position of the geometrical axis of the central collar 7 and eccentric socket 8. In practice, however, these two lines would probably be not more than $11/1000$ of an inch apart. This, of course, would depend upon the diameter of the bolt, the pitch of the thread and other considerations. In practice, however, the construction should be such that considerable force would be necessary in order to carry the rotating upper nut member 2 past the 180° position. Of course, the maximum resistance to this rotation would be encountered at 180°. Slightly beyond this point the resistance to rotation would decrease, and the outer adjacent faces of the lock member 2 and the lock member 1 would come together as indicated in Fig. 1. If these faces are employed to determine the possible degree of rotation of the outer lock member relative to the inner one, care should be taken that clearance is allowed for the fin 12 in the groove 13, and also clearance should be allowed as indicated in Fig. 1 between the other two adjacent faces of the two lock members which lie near the threads of the bolt 3.

As regards the act of bending the fin 12 by telescoping the two lock members together as indicated in Figs. 2 and 3, it will be noted that the bending of the fin occurs at a point located toward the root of the fin, and the bending action does not merely consist of bending the tip of the fin. This is what enables the interlocking fin and groove to hold the two lock members more or less positively though frictionally the proper distance apart, and in the proper oriented relation to enable them to be screwed simultaneously onto the threads of the bolt.

In practice, in order to insure that the threads on the outer lock member will properly match up with the other threads, the two lock members should be threaded simultaneously held clamped in their proper oriented position and with a spacer having the thickness $a$ between the lock members.

When the lock device is in use, it will be evident that as long as the outer lock member occupies its seated position on the inner lock member, the sides of the lock members will be firmly clamped against opposite sides of the bolt so as to offer a very considerable resistance to unscrew it, or backing off the two lock members together. Furthermore, the outer lock member 2 will not tend to unscrew or back off by reason of vibration, because in order to unscrew, it would have to tighten itself in passing by the 180° position.

The bottom or inner face of the inner locking member is preferably provided with a concentrically disposed recess 17. By reason of this recess, the pressure against the under side of the locking member 1 is concentrated toward its edge, and this gives this locking member more or less resiliency when it is being tightened up against its seat on the upper plate 5.

Many other embodiments of this invention may be resorted to without departing from the spirit of the invention.

What I claim is:

1. In a lock-nut construction, the combination of a threaded bolt member, an inner lock member and an outer lock member with threaded openings to screw onto the bolt member, an eccentric connection between said members capable of assuming a neutral position of substantially no eccentricity in which the axes of the lock members are in alignment; and means for stopping relative rotation of the lock members shortly after said eccentric connection has been rotated through more than 180° from its neutral position.

2. In a lock-nut construction, the combination of a threaded bolt member, an inner lock member and an outer lock member with threaded openings to screw onto the bolt member, an eccentric connection between said members including a collar on one of the lock members eccentric to its threaded opening, and an eccentric socket for the collar on the other lock member, said collar having a neutral position of substantially no eccentricity in which it holds the axes of the lock members in alignment; and means for stopping relative rotation of the lock members shortly after said eccentric collar has been rotated through more than 180° from its neutral position.

3. In a lock-nut construction, the combination of a threaded bolt member, an inner lock member and an outer lock member with threaded openings to screw onto the bolt member, an eccentric connection between said members operating in its neutral position of substantially no eccentricity to hold the axes of the lock members in alignment, means for yieldingly connecting said lock members together, operating to hold the same with the eccentric connection in said neutral position, to enable the two lock members to be screwed simultaneously onto the threaded bolt member until the rotation of the inner lock member is arrested by seating the same, the adjacent sides of the said lock members having a correlated construction permitting a continued rotation of the outer lock member through more than 180 degrees after the inner lock member has seated but stopping continued rotation of said outer lock member shortly after it has been rotated more than said 180°.

4. In a lock-nut construction, the combination of a threaded bolt member, an inner lock member and an outer lock member with threaded openings to screw onto the bolt member, an eccentric connection between said members operating in its neutral position of substantially no eccentricity to hold the axes of the lock members in alignment, one of said lock members having an annular groove on its face located toward the other lock member, and the said other lock member having an annular fin in alignment with the said groove, said parts cooperating when the lock members are held in axial alignment and moved toward each other, to press the fin into the said annular groove so as to bend the fin therein and form a friction-tight connection between the two lock members, and hold the same with the eccentric in said neutral position to enable the two lock members to be screwed simultaneously onto the threaded bolt until the rotation of the inner lock member is arrested by seating the same, the continued rotation of the outer lock member enabling the eccentric connection to be rotated through more than 180°, the adjacent faces of said locking members operating to abut and prevent further rotation of the outer locking member shortly after it has been rotated more than said 180°.

5. In a lock-nut construction, the combination of an inner lock member and an outer lock member with aligned threaded openings to receive a bolt member, an eccentric connection between said members capable of assuming a neutral position of substantially no eccentricity in which the axes of the lock members are in alignment; and means for stopping relative rotation of the lock members shortly after said eccentric connection has been rotated through more than 180° from its neutral position.

6. In a lock-nut construction for locking on a bolt member, the combination of an inner lock member and an outer lock member with threaded openings to screw onto the bolt member, an eccentric connection between said members capable of assuming a neutral position of substantially no eccentricity in which the axes of the lock members are in alignment; the eccentricity of said eccentric connection permitting a relative rotation of said lock members through more than 180° from said neutral position; and means for stopping relative rotation of the lock members shortly after said eccentric connection has been rotated through more than 180° from its neutral position.

7. In a lock-nut construction for locking on a bolt member, the combination of a first locking member and a second locking member, an eccentric connection between said locking members so that relative rotation between said locking members cause the same to move laterally relative to each other, said locking members being in axial alignment to provide for placing the same on said bolt member when said locking members are at a position substantially removed from their position of maximum lateral displacement, the eccentricity of said connection providing for relative rotation of said locking members past said position of maximum lateral displacement when on said bolt in order to lock said locking members on said bolt, and means for preventing further relative rotation of said locking members shortly after said position of maximum lateral displacement has been passed.

ALBERT W. MILLER.